(12) United States Patent
Cho

(10) Patent No.: US 12,377,483 B2
(45) Date of Patent: Aug. 5, 2025

(54) METHOD OF ASSEMBLING SUBSTRATE SUPPORTING APPARATUS

(71) Applicant: WONIK IPS CO., LTD., Pyeongtaek-si (KR)

(72) Inventor: Kyu Tae Cho, Pyeongtaek-si (KR)

(73) Assignee: WONIK IPS CO., LTD., Pyeongtaek-si (KR)

( * ) Notice: Subject to any disclaimer, the term of this patent is extended or adjusted under 35 U.S.C. 154(b) by 56 days.

(21) Appl. No.: 18/485,874

(22) Filed: Oct. 12, 2023

(65) Prior Publication Data
US 2024/0261882 A1    Aug. 8, 2024

(30) Foreign Application Priority Data
Feb. 6, 2023  (KR) .................. 10-2023-0015781

(51) Int. Cl.
B23K 1/00       (2006.01)
B23K 1/20       (2006.01)
B23K 35/30      (2006.01)
B23K 101/36     (2006.01)
H02N 13/00      (2006.01)

(52) U.S. Cl.
CPC .............. B23K 1/0016 (2013.01); B23K 1/20 (2013.01); B23K 35/3013 (2013.01); *B23K 2101/36* (2018.08); *H02N 13/00* (2013.01)

(58) Field of Classification Search
CPC ................. H01L 21/6831; H01L 21/6833
See application file for complete search history.

(56) References Cited

U.S. PATENT DOCUMENTS

| | | | | |
|---|---|---|---|---|
| 7,968,469 B2* | 6/2011 | Collins | ............ | H01J 37/32091 156/345.47 |
| 2008/0178803 A1* | 7/2008 | Collins | ............ | H01J 37/32091 118/708 |
| 2008/0179181 A1* | 7/2008 | Collins | ............ | H01J 37/32174 204/164 |
| 2008/0236492 A1* | 10/2008 | Yamazawa | ........ | H01J 37/32091 118/723 I |
| 2009/0236214 A1* | 9/2009 | Janakiraman | ..... | H01J 37/32532 118/723 R |
| 2012/0247677 A1* | 10/2012 | Himori | ............ | H01J 37/32091 156/345.44 |
| 2013/0000848 A1* | 1/2013 | Wongsenakhum | ........................ | H01L 21/68735 156/345.34 |
| 2013/0107415 A1* | 5/2013 | Banna | ................. | H01L 21/6831 361/234 |
| 2013/0181038 A1* | 7/2013 | Elliot | ....................... | B32B 3/30 228/221 |

(Continued)

*Primary Examiner* — Erin B Saad
(74) *Attorney, Agent, or Firm* — WILLIAM PARK & ASSOCIATES LTD.

(57) ABSTRACT

Disclosed herein is a method of assembling a substrate supporting apparatus, including coupling a conductive rod to an electrode installed in a substrate support provided to support a substrate, forming a sacrificial layer on the rod, bonding the rod and the electrode by melting and infiltrating a filler into a coupling area between the rod and the electrode, while forming a protective layer between the rod and the sacrificial layer by infiltrating the filler into a gap between the rod and the sacrificial layer, and coupling a shaft to the substrate support, the rod extending through the shaft.

9 Claims, 8 Drawing Sheets

(56) References Cited

U.S. PATENT DOCUMENTS

| | | | | |
|---|---|---|---|---|
| 2015/0108203 A1* | 4/2015 | Elliot | ............... | B32B 9/041 |
| | | | | 228/121 |
| 2016/0172161 A1* | 6/2016 | Ikenaga | ............ | H01J 37/32724 |
| | | | | 156/345.28 |
| 2018/0033668 A1* | 2/2018 | Tsuchida | ............. | H01L 21/6833 |
| 2018/0218885 A1* | 8/2018 | Maeda | ............. | H01J 37/32724 |
| 2020/0135526 A1* | 4/2020 | Takahashi | ........... | H01L 21/6831 |
| 2020/0173017 A1* | 6/2020 | Ramalingam | ..... | H01J 37/32724 |
| 2021/0066039 A1* | 3/2021 | Li | ...................... | H01L 21/6831 |

* cited by examiner

METHOD OF ASSEMBLING SUBSTRATE SUPPORTING APPARATUS

CROSS-REFERENCE TO RELATED APPLICATION

This application claims priority under 35 U.S.C. § 119(a) to Korean Patent Application No. 10-2023-0015781, filed on Feb. 6, 2023, in the Korean Intellectual Property Office, which is incorporated herein by reference in its entirety.

BACKGROUND

1. Field of the Invention

The present disclosure relates to a semiconductor manufacturing apparatus, and more particularly, to a method of assembling a substrate supporting apparatus.

2. Description of the Related Art

To manufacture semiconductor devices, various substrate processing processes are performed by a substrate processing apparatus in a vacuum atmosphere. For example, a substrate may be loaded into a process chamber, and processes such as depositing a thin film on the substrate or etching a thin film on the substrate may be performed. Here, the substrate is supported by a substrate supporting apparatus installed within the process chamber, which may have electrodes installed therein to induce RF currents on the substrate or to provide electrostatic forces on the substrate.

These electrodes may be assembled with rods for power transfer. When the rods are bonded to the electrodes, they may be subjected to a high-temperature filling and bonding process to reduce contact resistance. Recently, research has been conducted on changing the material of the rod to suppress the heating caused by inductive heating of the rod.

However, due to oxidation of the rod during use, the resistance or impedance changes. In order to prevent oxidation of the rod, surface coating may be applied. However, during the aforementioned high-temperature bonding process, the coating may partially melt or crack, which fails to prevent oxidation of the rod and changes the process conditions.

SUMMARY OF THE DISCLOSURE

Therefore, the present disclosure has been made in view of the above problems, and it is an object of the present disclosure to provide a method of assembling a substrate supporting apparatus that prevents oxidation of the rod and thus does not result in a change in process conditions. However, this object is exemplary and is not intended to limit the scope of the present disclosure.

In accordance with the present disclosure, the above and other objects can be accomplished by the provision of a method of assembling a substrate supporting apparatus. The method may include coupling a conductive rod to an electrode installed in a substrate support provided to support a substrate, forming a sacrificial layer on the rod, bonding the rod and the electrode by melting and infiltrating a filler into a coupling area between the rod and the electrode, while forming a protective layer between the rod and the sacrificial layer by infiltrating the filler into a gap between the rod and the sacrificial layer, and coupling a shaft to the substrate support, the rod extending through the shaft.

The method may further include removing the sacrificial layer after the forming of the protective layer.

According to the method, the sacrificial layer may contain a ceramic material.

According to the method, the sacrificial layer may include an Al2O3 layer.

According to the method, the filler may include a noble metal unreactive with oxygen such that the sacrificial layer is oxidation resistant.

According to the method, the filler may include Au or an Au alloy.

According to the method, the rod may contain a molybdenum (Mo) material that is paramagnetic to suppress generation of inductive heating.

According to the method, the melting and infiltrating of the filler in the forming of the protective layer may be performed using a brazing process, wherein a temperature of the brazing process may be higher than a melting temperature of the filler.

According to the method, the electrode may include an RF electrode or an electrostatic electrode.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
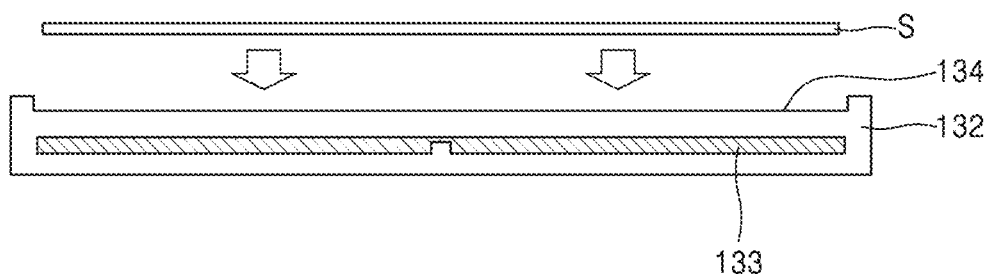
FIGS. 1 to 6 are schematic cross-sectional views illustrating a method of assembling a substrate supporting apparatus according to one embodiment of the present disclosure.

Hereinafter, several preferred embodiments of the present disclosure will be described in detail with reference to the accompanying drawings.

The embodiments of the present disclosure are provided to provide a thorough understanding of the present disclosure to those skilled in the art. Various modifications may be made to the following embodiments, and the scope of the present disclosure is not limited to the following embodiments. Rather, these embodiments are provided to make the disclosure complete and to fully convey the ideas of the disclosure to those skilled in the art. In addition, the thickness or size of each layer in the drawings is exaggerated for ease of illustration and clarity.

FIGS. 1 to 6 are schematic cross-sectional views illustrating a method of assembling a substrate supporting apparatus 130 according to one embodiment of the present disclosure. FIGS. 2 to 5 may be partial enlarged views of a portion of the substrate supporting apparatus 130.

Referring to FIG. 1, a substrate support 132 may be provided to support a substrate S. For example, a seating groove 134 may be formed on a top surface of the substrate support 132, and the substrate S may be seated in the seating groove 134. The substrate support 132 may be formed in various shapes depending on the shape of the substrate S. For example, when the substrate S is in the shape of a wafer, the substrate support 132 may be formed in the shape of a disk.

At least one conductive electrode 133 may be installed in the substrate support 132. For example, the electrode 133 may include an electrostatic electrode for applying an electrostatic force to the substrate S, or may include an RF electrode that functions to allow RF current to flow into the substrate support 132. Additionally, a thermal wire heater (not shown) may be further formed in the substrate support 132 to heat the substrate S.

In some embodiments, the substrate support 132 may include a ceramic material, such as an AlN material.

Figure 2:
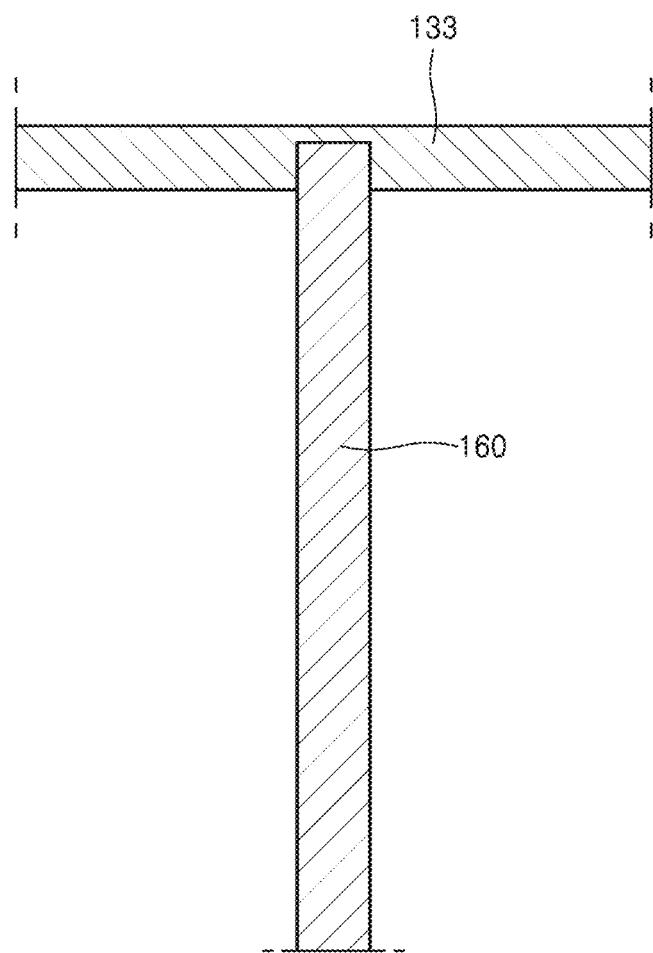

Referring to FIG. 2, a rod 160 may be coupled to the electrode 133 installed in the substrate support 132. For example, a threaded groove may be formed at a coupling portion of the electrode 133 and a thread may be formed on a coupling portion of the rod 160, such that the electrode 133 and the rod 160 may be coupled to each other in a screwing manner. In another example, a groove may be formed in the coupling portion of the electrode 133, and the rod 160 may be press-fit into the groove and coupled to the electrode 133.

Figure 3:
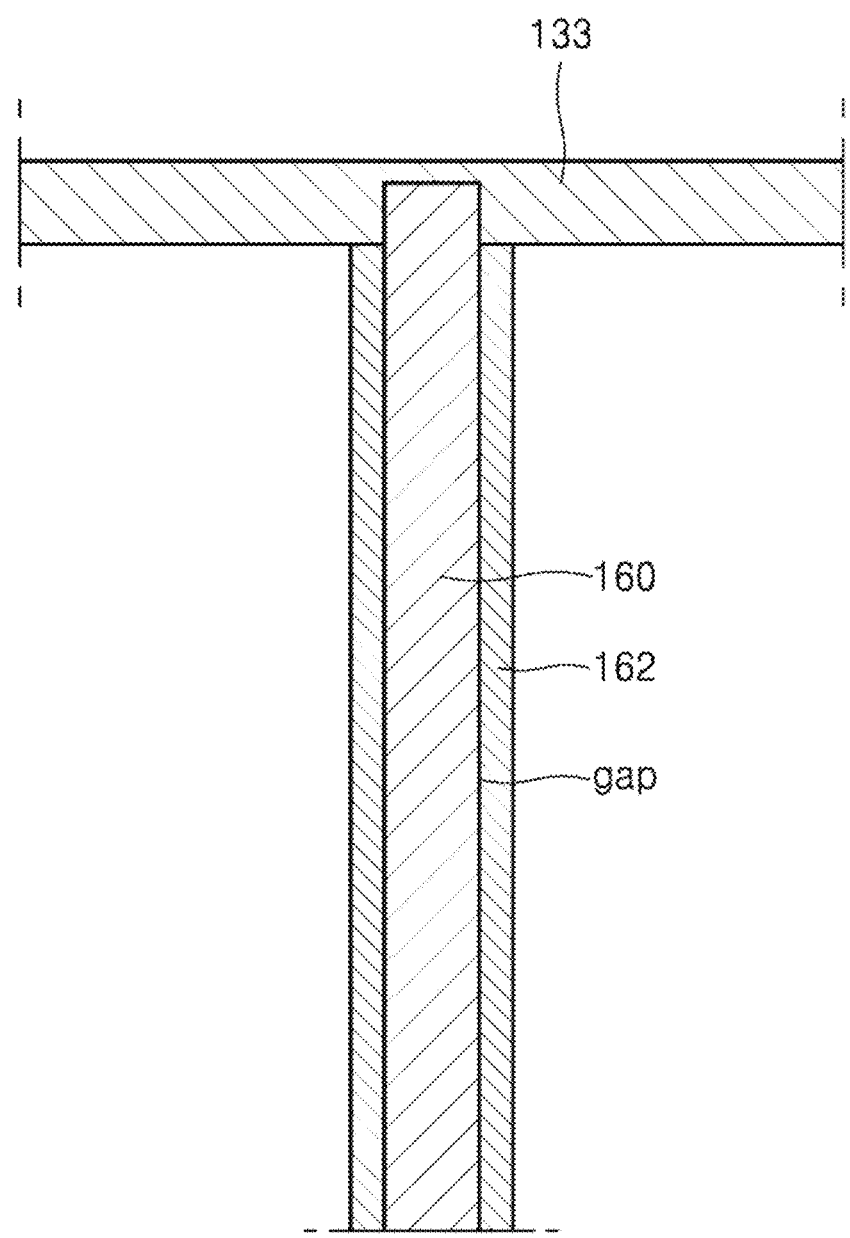

Referring to FIG. 3, a sacrificial layer 162 may be formed on the rod 160. The sacrificial layer 162 may be formed to entirely surround the rod 160, but there may be a fine gap between the rod 160 and the sacrificial layer 162. Thus, the sacrificial layer 162 may be formed using a material and/or method that allows the sacrificial layer 162 not to be fully bonded to the rod 160, such that a gap is formed to some degree.

For example, the sacrificial layer 162 may include a ceramic material. For example, the sacrificial layer 162 may include an $Al_2O_3$ layer. The sacrificial layer 162 of a ceramic material may prevent oxidation of the rod 160 and may be readily formed by forming a coating on the rod 160. For example, the sacrificial layer 162 may be formed using various methods, such as thermal spray coating and evaporative deposition. However, when the rod 160 is made of molybdenum (Mo), there is a large difference in the coefficient of thermal expansion between the rod 160 made of molybdenum and the sacrificial layer 162 made of a ceramic material. Thus, the sacrificial layer 162 may not remain on the rod 160 continuously and needs to be removed after a certain time.

Figure 4:
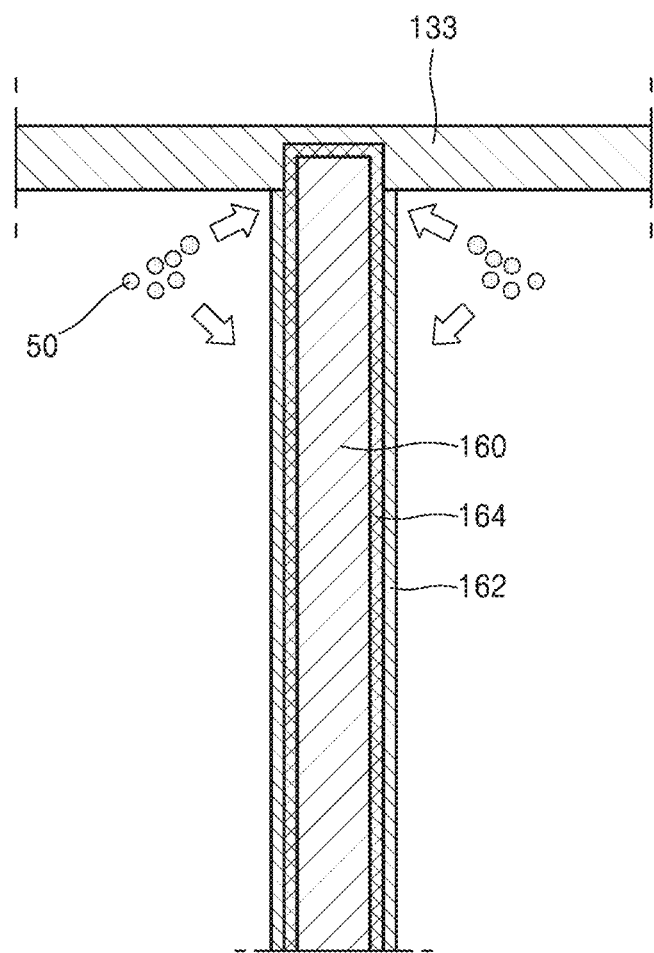

Referring to FIG. 4, the rod 160 and the electrode 133 may be bonded by melting and infiltrating a filler 50 into the coupling area between the rod 160 and the electrode 133. This bonding process may not only increase the mechanical bonding force between the rod 160 and the electrode 133, but may also increase the bonding area between the rod 160 and the electrode 133, which may function to lower the electrical contact resistance between the rod 160 and the electrode 133.

The molten filler 50 may penetrate into the junction of the rod 160 and the electrode 133 by capillary action and solidify, thereby bonding the two elements. Thus, the filler 50 may be required to be fluidic enough to exhibit capillarity in the molten state, and may be required to have high electrical conductivity.

Further, the filler 50 may also infiltrate into the gap between the rod 160 and the sacrificial layer 162 to form a protective layer 164 with the filler 50 bet ween the rod 160 and the sacrificial layer 162. Thus, the protective layer 164 may be formed by solidification of the molten filler 50 after capillary infiltration of the filler 50 into the gap between the rod 160 and the sacrificial layer 162.

The protective layer 164 is intended to protect the rod 160, and may be required to be oxidation resistant, for example, to prevent oxidation of the rod 160. Accordingly, the filler 50, which is the material of the protective layer 164, may be required to have chemical resistance that does not react with oxygen or nitrogen. For example, the filler 50 may include a noble metal that does not react with oxygen to make the protective layer 164 resistant to oxidation.

In some embodiments, the filler 50 may include Au or an Au alloy, and the protective layer 164 may be configured as a layer of Au or an Au alloy. For example, the Au alloy used for the filler 50 may contain Ni in addition to at least 70% Au in terms of wettability. In overall consideration of electrical conductivity, wettability, oxidation resistance, etc., Au of high purity may be selected for the filler 50. Au alloy may be adopted from an economical perspective.

In some embodiments, the process of melting the filler 50 to infiltrate into the gap between the rod 160 and the electrode 133 or between the rod 160 and the sacrificial layer 162 may employ a brazing process. The temperature of the brazing process may be set higher than the melting temperature of the filler to melt the filler. For example, the melting temperature of the filler 50 is greater than or equal to 1000° C., and thus the brazing process may be at a temperature greater than or equal to 1000° C., for example, about 1200° C. In the brazing process, the filler 50 may be referred to as a filler material.

In some embodiments, the rod 160 may include a molybdenum (Mo) material, which is paramagnetic to suppress the occurrence of inductive heating. For example, when the rod 160 is made of nickel (Ni), a ferromagnetic material, the rod 160 may be subject to inductive heating in an RF power usage atmosphere. However, molybdenum (Mo) can be oxidized at a temperature above 300° C., and particularly to form MoO3 oxide with very high resistivity at a temperature at or above 600° C.

This oxidation of the molybdenum (Mo) may result in a change in resistance and/or impedance of the rod 160. The protective layer 164 may function as an oxidation resistant film on the rod 160 containing molybdenum (Mo).

As described above, the filler 50 can be used as a bonding material between the rod 160 and the electrode 133 and also as the protective layer 164 between the rod 160 and the sacrificial layer 162. The filler 50 may uniformly infiltrate into the gap between the rod 160 and the sacrificial layer 162 by capillary action, and thus the protective layer 164 may be uniformly formed on the rod 160.

Figure 8:
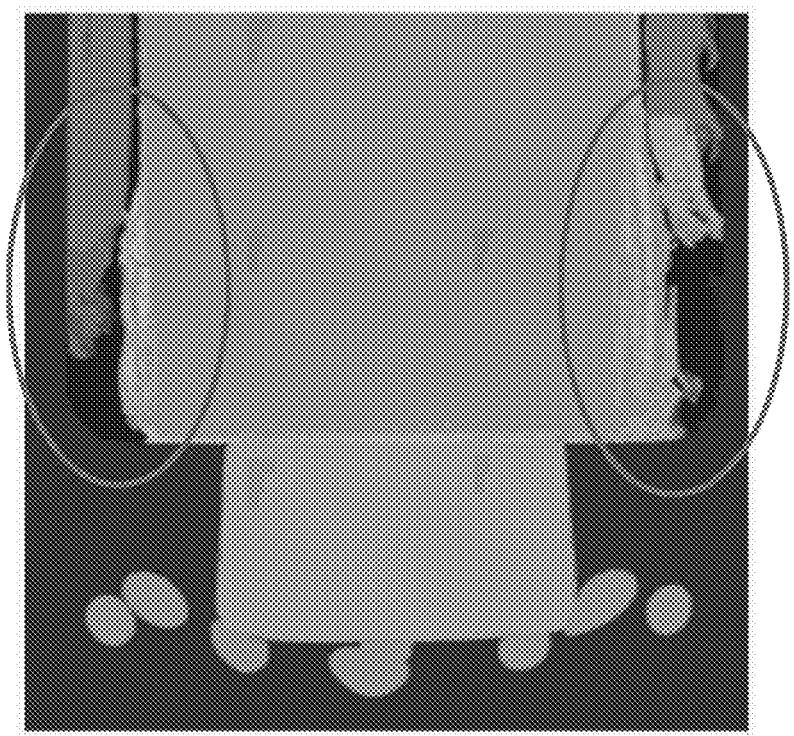
FIG. 8 is a photograph showing the melting of a protective layer during a brazing process, in a comparative example.

If the sacrificial layer 162 is not present on the rod 160, it is difficult for the protective layer 164 to be uniformly formed on the rod 160 in the brazing process. Also, as shown in FIG. 8, if the protective layer 164 is first formed on the rod 160 by other means without the sacrificial layer 162 in the comparative example and then the brazing process is performed, the protective layer 164 may melt and become uneven during the brazing process.

Figure 5:
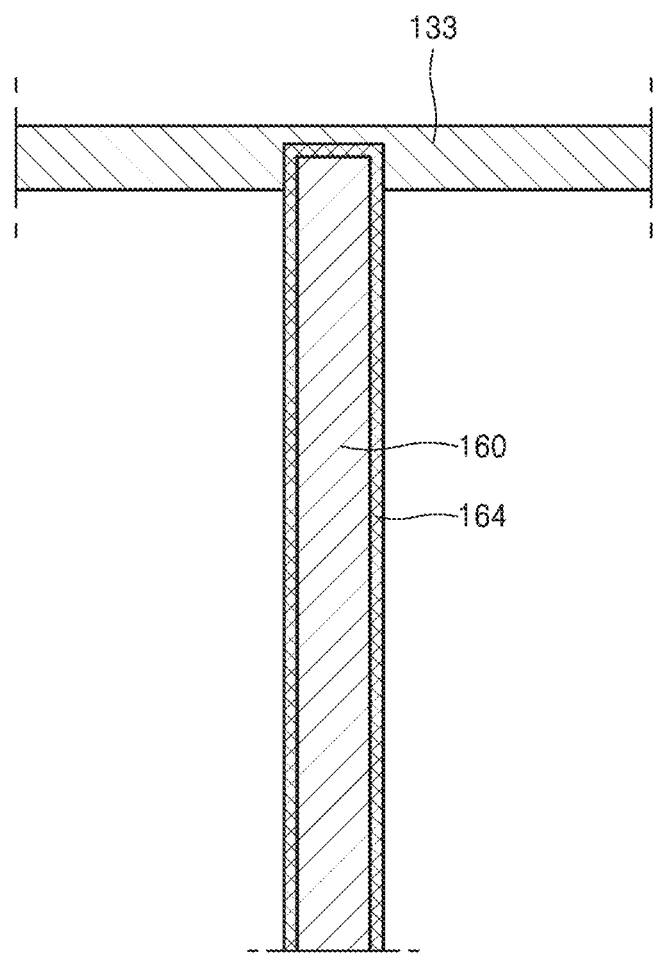

Referring to FIG. 5, the sacrificial layer 162 may be removed, leaving the protective layer 164 on the rod 160. For example, the sacrificial layer 162 may be removed using various methods including wet etching.

Figure 6:
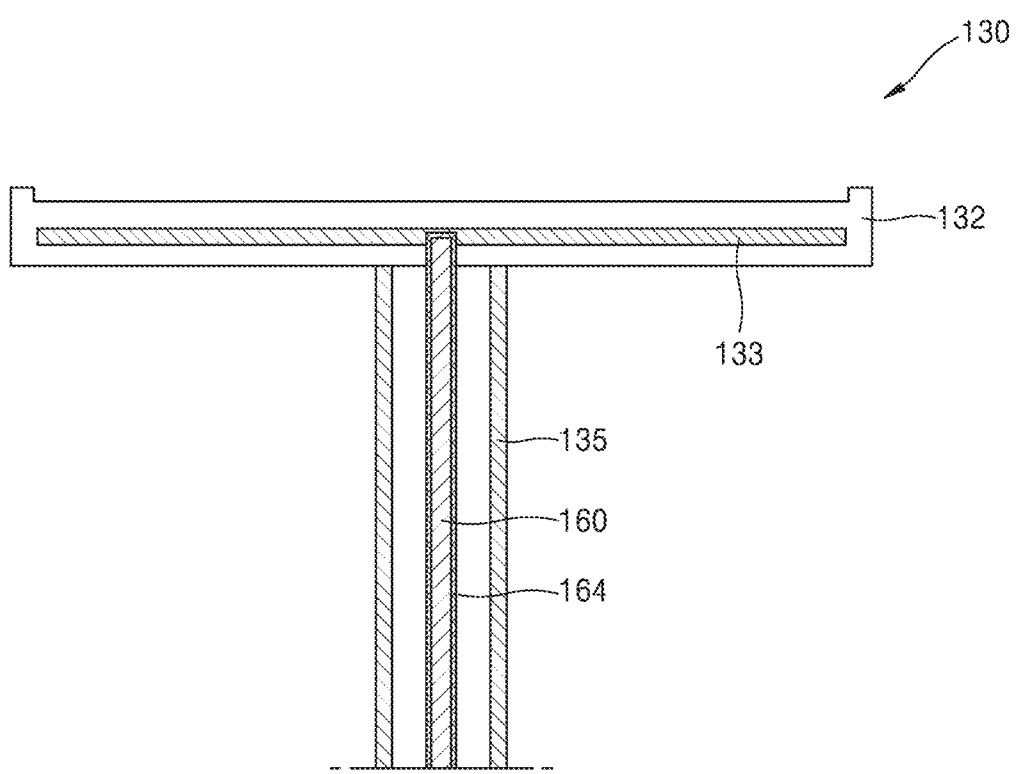

Referring to FIG. 6, a shaft 135 may be coupled to the substrate support 132. For example, the shaft 135 may be coupled to the bottom surface of the substrate support 132, and the rod 160 may be disposed to extend through the shaft 135. For example, a hole may be formed in the shaft 135, and the rod 160 may be disposed in the hole in the shaft 135.

The substrate supporting apparatus 130 may be manufactured or assembled as described above. For example, the substrate supporting apparatus 13 may include the substrate support 132 for supporting the substrate S and the shaft 135 coupled to the substrate support 132. The electrode 133 may be disposed in the substrate support 132, and the rod 160 for providing power may extend through the shaft 135 and be coupled to the electrode 133. The rod 160 may be connected to a power supply or the like.

Figure 7:
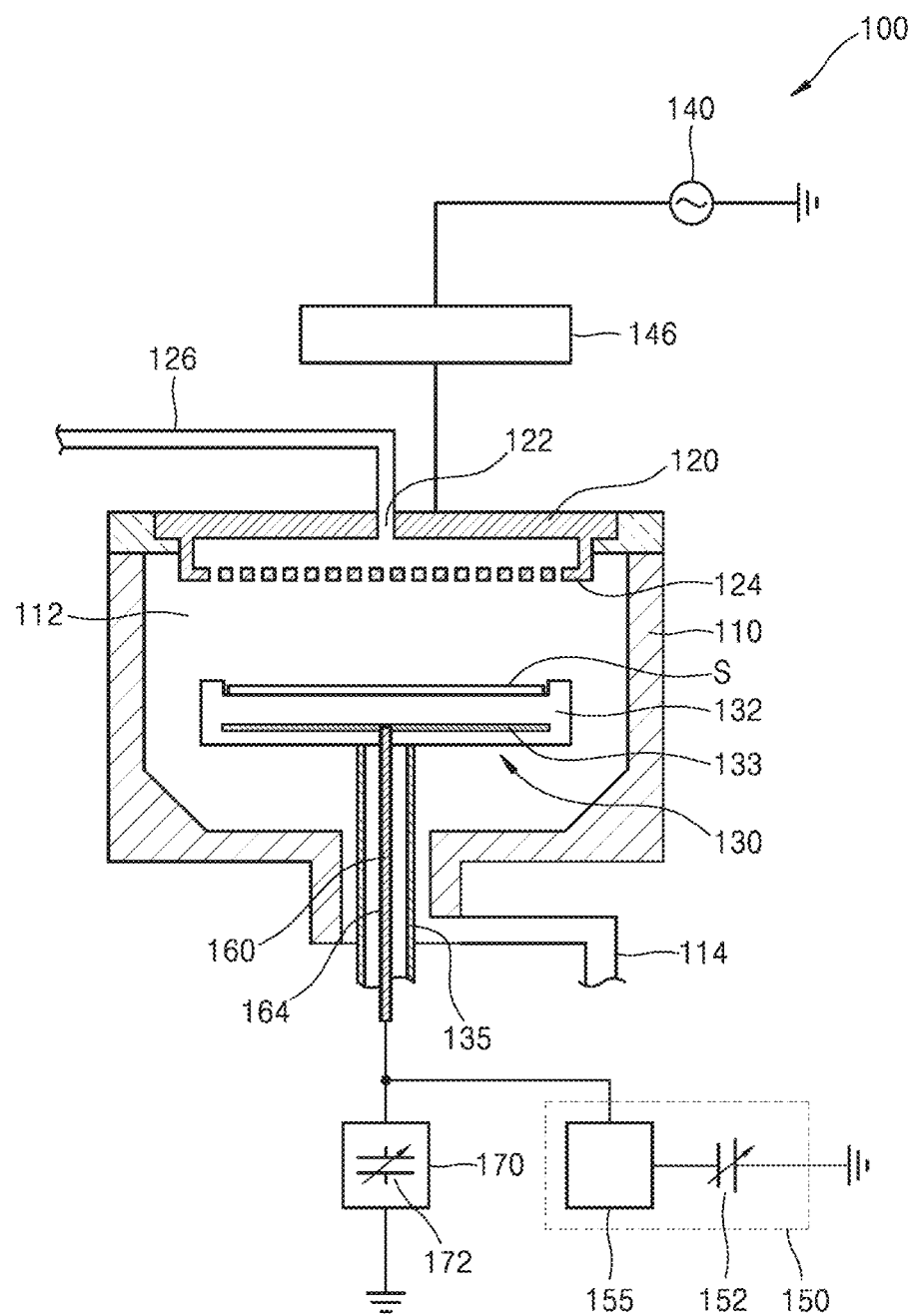
FIG. 7 is a schematic cross-sectional view illustrating a substrate processing apparatus according to another embodiment of the present disclosure.

FIG. 7 is a schematic cross-sectional view illustrating a substrate processing apparatus 100 according to another embodiment of the present disclosure.

Referring to FIG. 7, the substrate processing apparatus 100 may include a process chamber 110, a gas injector 120, and the substrate supporting apparatus 130.

Inside the process chamber 110, a reaction space 112 for processing of the substrate S may be formed. For example, the process chamber 110 may be configured to be airtight and may be connected to a vacuum pump (not shown) via an exhaust port 114 to discharge process gas from the reaction space 112 and to regulate the vacuum in the reaction space 112.

The gas injector 120 may be installed in the process chamber 110 to supply process gas supplied from outside of the process chamber 110 into the reaction space 112. The gas injector 120 may be installed at the top of the process chamber 110 against the substrate support 132 to inject process gas onto the substrate S seated on the substrate support 132. The gas injector 120 may be supplied with process gas from the outside via a gas inlet 122 connected to a gas inflow line 126, and may include a plurality of downwardly oriented injection holes facing the substrate S to inject process gas onto the substrate S.

For example, the gas injector 120 may be in the form of a shower head, a nozzle, or the like. When the gas injector 120 is in the form of a shower head, the gas injector 120 may be coupled to the process chamber 110 so as to partially cover an upper portion of the process chamber 110 and may inject process gas into the reaction space 112 through an injector plate 124. For example, the gas injector 120 may be coupled to a cover portion or sidewall portion of the process chamber 110 in the form of a lid.

The substrate supporting apparatus 130 may be provided to support the substrate S. For details about the substrate supporting apparatus 130, refer to the description of FIG. 6.

A plasma power source 140 may be connected to the gas injector 120 to provide power to form a plasma atmosphere inside the process chamber 110. For example, the plasma power source 140 may include at least one RF power source configured to apply at least one radio frequency (RF) power to the process chamber 110. For example, the plasma power source 140 may be connected to the gas injector 120 to apply RF power to the gas injector 120. In this case, the gas injector 120 may be referred to as a power supply electrode or an upper electrode.

Additionally, an impedance matcher 146 may be disposed between the plasma power source 140 and the gas injector 120 for impedance matching. RF power supplied from the plasma power source 140 may be properly impedance matched through the impedance matcher 146 between the plasma power source 140 and the process chamber 110 so as to be effectively delivered to the process chamber 110 without being reflected back from the process chamber 110.

The substrate support 132 of the substrate supporting apparatus 130 may include an electrode 133 therein. The electrode 133 may be connected to an electrostatic power supply 150 to apply an electrostatic force to the substrate S, and/or may be connected to a plasma current control circuitry 170 to allow RF current to flow on the substrate S.

For example, the electrostatic power supply 150 may include a DC power source 152 to supply DC power to the electrode 133. For example, the DC power source 152 may be arranged such that one end thereof is connected to ground and the other end is electrically connected to the electrode 133.

Additionally, the electrostatic power supply 150 may include a DC filter 155 disposed between the electrode 133 and the DC power source 152 to block RF current from flowing into the DC power source 152 via the electrode 133. The DC filter 155 may be configured in various forms to block RF current while allowing DC current to pass therethrough.

The plasma current control circuitry 170 may be connected to the substrate support 132 to control the plasma current flowing on the substrate S. For example, the plasma current control circuitry 170 may be connected to the electrode 133 in the substrate support 132 to control the plasma atmosphere between the gas injector 120 and the substrate support 132.

The plasma current control circuitry 170 is intended to control the ratio of the RF current to the side wall of the process chamber 110 and the RF current to the substrate support 132 or the substrate S to control the plasma characteristics on the substrate S under the condition that impedance is matched between the plasma power source 140 and the process chamber 110, and may be distinct from the impedance matcher 146 for impedance matching between the plasma power source 140 and the process chamber 110.

The plasma current control circuitry 170 may include an element 172 for current control therein. For example, the element 172 may include at least one RF filter for passing RF current and at least one DC blocking element for blocking DC current. The DC blocking element may be provided separately from the RF filter, or may include some elements that are in the RF filter.

While FIG. 7 illustrates a structure in which the electrode 133 is connected to the electrostatic power supply 150 and the plasma current control circuitry 170 in a shared manner, the electrode 133 may be connected only to the electrostatic power supply 150 or only to the plasma current control circuitry 170 in some embodiments.

The substrate processing apparatus 100 may be employed as a plasma enhanced chemical vapor deposition (PECVD) apparatus or an atomic layer deposition (ALD) apparatus.

According to the above-described substrate processing apparatus 100, oxidation of the rod 160 in the substrate supporting apparatus 130 may be prevented by the protective layer 164. Thereby, changes in resistance and impedance of the substrate supporting apparatus 130 may be prevented, and thus process reliability may be increased.

As is apparent from the above description, the present disclosure provides the following effect.

According to the method of assembling a substrate supporting apparatus according to some embodiments of the present disclosure implemented as described above, a protective layer may be uniformly formed on the rod to prevent oxidation of the rod, thereby improving process reliability without altering process conditions. It should be noted that the scope of the present disclosure is not limited by this effect.

The present disclosure has been described with reference to the embodiments illustrated in the drawings, which are exemplary only. Those skilled in the art will understand that many variations and equivalents are possible. Therefore, the true scope of the present disclosure should be defined by the appended claims of the present disclosure.

What is claimed is:

1. A method of assembling a substrate supporting apparatus, the method comprising:

coupling a conductive rod to an electrode installed in a substrate support provided to support a substrate;

forming a sacrificial layer that surrounds the rod;

bonding the rod and the electrode by melting and infiltrating a filler into a coupling area between the rod and the electrode, while forming a protective layer between the rod and the sacrificial layer by infiltrating the filler into a gap between the rod and the sacrificial layer; and coupling a shaft to the substrate support, the rod extending through the shaft.

2. The method of claim 1, further comprising:

removing the sacrificial layer after the forming of the protective layer.

3. The method of claim 1, wherein the sacrificial layer contains a ceramic material.

4. The method of claim 3, wherein the sacrificial layer comprises an $Al_2O_3$ layer.

5. The method of claim 1, wherein the filler comprises a noble metal unreactive with oxygen such that the sacrificial layer is oxidation resistant.

6. The method of claim 5, wherein the filler comprises Au or an Au alloy.

7. The method of claim 1, wherein the rod contains a molybdenum (Mo) material that is paramagnetic to suppress generation of inductive heating.

8. The method of claim 1, wherein the melting and infiltrating of the filler in the forming of the protective layer is performed using a brazing process, wherein a temperature of the brazing process is higher than a melting temperature of the filler.

9. The method of claim 1, wherein the electrode comprises an RF electrode or an electrostatic electrode.

\* \* \* \* \*